United States Patent [19]
Espeland et al.

[11] Patent Number: 6,034,155
[45] Date of Patent: Mar. 7, 2000

[54] POLYMER CONCRETE COMPOSITIONS, STRUCTURES MADE THEREFROM AND METHODS OF MANUFACTURE

[75] Inventors: John D. Espeland, West Des Moines; Robert W. Espeland, Urbandale; Michael L. Olson, West Des Moines, all of Iowa

[73] Assignee: ECT Incorporated, West Des Moines, Iowa

[21] Appl. No.: 09/042,521

[22] Filed: Mar. 16, 1998

[51] Int. Cl.[7] ............... C08K 3/30; C08K 3/34; C08K 3/36; C08K 3/40; C08L 67/06
[52] U.S. Cl. .......... 523/220; 523/437; 523/440; 523/513; 523/516; 524/423; 524/449; 524/492; 524/493; 524/494
[58] Field of Search .............. 523/220, 437, 523/440, 513, 516; 524/423, 449, 492, 493, 494

[56] References Cited

U.S. PATENT DOCUMENTS

| | | | |
|---|---|---|---|
| 3,888,712 | 6/1975 | Akiyoshi et al. | 656/171 |
| 4,371,639 | 2/1983 | Muszynski | 523/512 |
| 4,375,489 | 3/1983 | Muszynski | 428/36 |
| 4,621,010 | 11/1986 | Wadsworth | 428/220 |
| 4,730,012 | 3/1988 | Espeland et al. | 523/505 |
| 4,737,538 | 4/1988 | Halper et al. | 524/505 |
| 4,885,072 | 12/1989 | Harry et al. | 204/279 |
| 5,017,632 | 5/1991 | Bredow et al. | 523/400 |
| 5,037,520 | 8/1991 | Harry et al. | 204/279 |
| 5,066,379 | 11/1991 | Harry et al. | 204/279 |
| 5,079,050 | 1/1992 | Harry et al. | 428/34.5 |
| 5,384,355 | 1/1995 | Allen | 524/650 |
| 5,794,402 | 8/1998 | Dumlao et al. | 52/783.17 |

OTHER PUBLICATIONS

R.A. Cubeta, "The Uses of Precast Polymer Concrete Shapes", *Corrosion 87*, Paper No. 162, pp. 1–6 (Mar. 9–13, 1987).

L. Czarnecki, "The Status of Polymer Concrete", *Concrete International*, 7 pages (1985).

R. Krels, "The Scope and Application of Synthetic Resin Concrete", Respecta America, Inc., 5 pages.

"Reichhold Chemical Polymer Concrete Typical Formulation", 1 page.

*Primary Examiner*—Peter A. Szekely
*Attorney, Agent, or Firm*—Mueting, Raasch & Gebhardt, P.A.

[57] ABSTRACT

A polymer concrete composition preparable by combining components comprising: a resin blend comprising a major amount of at least one rigid unsaturated polyester resin; a minor amount of at least one flexible unsaturated polyester resin; a minor amount of at least one vinyl ester resin; and a minor amount of at least one thermoplastic resin; at least about 10 weight percent, based on the total weight of the composition, of extremely filler material having an average particle size of less than about 500 microns; and at least about 20 weight percent, based on the total weight of the composition, of fine filler material having an average particle size of about 500 microns to about 1000 microns.

26 Claims, No Drawings

POLYMER CONCRETE COMPOSITIONS, STRUCTURES MADE THEREFROM AND METHODS OF MANUFACTURE

BACKGROUND OF THE INVENTION

This invention relates to polymer concrete compositions for use in making corrosion resistant structures and other structural composite elements, as well as methods of making same. Polymer concrete is a term that applies to a variety of composites of polymer and concrete or aggregate, for example. Such composites can be made by impregnating hardened portland cement with a liquid monomeric material that is subsequently polymerized in situ. Alternatively, they can be made by combining monomeric, oligomeric, and/or polymeric material with a fresh Portland cement concrete mixture, which is then subsequently hardened. Other composites referred to as polymer concrete do not contain cement, per se; rather, they are composites made by polymerizing a monomeric, oligomeric and/or polymeric material with filler material, such as aggregate (e.g., gravel, sand, etc.).

Polymer concrete composites have generally good durability and resistance to salts, acids, and other corrosive materials, depending on the formulation. They are, therefore, suitable for use in pipe, tunnel support liners, bridge deckings, sumps, manholes, interceptor structures, and corrosion resistant electrolytic containers, for example. These represent a significant market for use of polymer concrete composites.

The main objective of pipe manufacturers in the early 1960's was to develop a polymer concrete pipe with resistance to corrosion from both acidic and caustic effluents inside the pipe, and from chemical attack outside the pipe. Other objectives included designing significant axial and compressive strengths without adding steel or fiberglass reinforcement. These pipes were mainly used for collection systems in chemical plants with highly corrosive environments. Manufacturing of polymer concrete pipe was slowed down in the late 1960's due to poor mix designs and manufacturing problems, which kept polymer concrete from being an economically viable product.

Traditionally, water or wastewater infrastructures have been constructed of steel reinforced Portland cement concrete, clay tile, brick, and ductile iron, all of which are subject to corrosion or maintenance problems. Anaerobic bacteria cause microbiologically induced corrosion as a result of the formation of waterline condensates of carbon dioxide and hydrogen sulfide gases, which produce sulfuric acid that chemically attacks Portland cement concrete and carbon steel reinforcement. Also, concrete pipe deteriorates rapidly in sewage due to hydrogen sulfide attack, which often erodes the upper surface of the pipe (i.e., that which is open to air), eventually causing a cave-in. An additional detrimental activity is that many concrete pipe systems are purged with caustic and hypochlorite in order to suppress the sulfide odor caused by the sewage.

One way in which Portland cement concrete has been protected from corrosive solutions and environments is to use a protective liner. However, such liners easily tear, leak, or pull away from the concrete. As a result, corrosive solutions, mist, and/or vapor from the wastewater can penetrate the area between the liner and the concrete structure, thereby causing corrosion and failure of the structure. Protective surface coatings are also widely used to protect Portland cement concrete and ductile iron products in wastewater applications. Problems associated with these coatings are similar to the problems associated with plastic liners, as well as problems associated with adhesion, consistent coating thickness, brittleness, installation, and surface preparation.

Another effort to provide a structure which can withstand the highly corrosive environment of the wastewater solution is through the use of polymer concrete. Typical polymer concrete composites are made from one or more thermosetting resins, a promoter, and catalyst to cure the material, along with aggregate. The most commonly used thermosetting resin is an unsaturated polyester resin. The resin within the mix bonds the aggregate, much like Portland Cement does in traditional concrete structures. Polymer concrete can also include fillers such as sand, silica flour, mica flakes, glass spheres, and fiberglass in various sizes.

Although conventional polymer concrete composite structures are a great improvement, many compositions still have numerous disadvantages. Some of the disadvantages include the high cost of fabrication due to the material costs and manufacturing techniques used. There can also be problems with the formation of cold joints from the casting process, which can cause leaking and leaching paths. Polymer concrete structures can also have irregular interior surfaces, which can cause difficulty in cleaning the structure. If external connections are attached to the polymer concrete structures, these can also be the source of leaks and leaching.

A significantly improved polymer concrete composition is known that includes a blend of thermoset and thermoplastic resins. Using a major amount of a vinyl ester resin in the resin blend allows for such compositions to be used in structures exposed to extremely corrosive environments, such as electrolytic containers. Although wastewater structures can be exposed to corrosive conditions, such conditions are not as corrosive as those used in electrolytic mineral processing. Thus, less corrosion resistant compositions could be used. Thus, there is a need for materials that can be used in water and wastewater infrastructures that are sufficiently corrosion resistent yet not as expensive as those used in electrolytic containers.

SUMMARY OF THE INVENTION

The present invention provides a castable polymer concrete composition preparable by combining components comprising: a resin blend comprising a major amount of at least one rigid unsaturated polyester resin, a minor amount of at least one flexible unsaturated polyester resin, a minor amount of at least one vinyl ester resin, and a minor amount of at least one thermoplastic resin (preferably, at least one polyester-polyurethane resin); at least about 10 weight percent (preferably, about 10–60 weight percent), based on the total weight of the composition, of filler material having an average particle size of less than about 500 microns; at least about 20 weight percent (preferably, about 20–60 weight percent), based on the total weight of the composition, of filler material having an average particle size of about 500–1000 microns; and at least about 15 weight percent (preferably, about 15–60 weight percent), based on the total weight of the composition, of filler material having an average particle size of greater than about 1000 microns.

A particularly preferred embodiment comprises a resin blend of a major amount (preferably, about 6 weight percent to about 20 weight percent) of at least one rigid isophthalic or orthophthalic polyester resin (a thermoset resin), a minor amount (preferably about 0.5 weight percent to about 3 weight percent) of at least one flexible isophthalic or orthophthalic polyester resin (a thermoset resin), a minor amount (preferably, about 0.5 weight percent to about 3 weight percent) of at least one modified epoxy vinyl ester resin (a thermoset resin), and a minor amount (preferably, about 0.5 weight percent to about 5 weight percent) of at least one polyester-polyurethane resin (a thermoplastic resin). The terms major and minor amount are used in the context of the resin blend, although the preferred weight percents are based on the total weight of the composition. In addition to the filler materials described above, the polymer concrete compositions of the present invention may further include fibrous reinforcement material.

Another embodiment of the present invention is a castable polymer concrete composition preparable by combining components comprising: a resin blend comprising a major amount of at least one rigid unsaturated polyester resin, a minor amount of at least one flexible unsaturated polyester resin, a minor amount of at least one vinyl ester resin, and a minor amount of at least one thermoplastic resin; and at least about 10 weight percent, based on the total weight of the composition, of baryte (barium sulfate).

Another embodiment of the present invention is a polymer concrete composite preparable by: combining components comprising a resin blend comprising a major amount of at least one rigid unsaturated polyester resin, a minor amount of at least one flexible unsaturated polyester resin, a minor amount of at least one vinyl ester resin, and a minor amount of at least one thermoplastic resin (preferably, at least one polyester-polyurethane resin); at least about 10 weight percent, based on the total weight of the composition, of filler material having an average particle size of less than about 500 microns; at least about 20 weight percent, based on the total weight of the composition, of filler material having an average particle size of about 500–1000 microns; and at least about 20 weight percent based on the total weight of the composition of filler material having an average particle size of greater than about 1000 microns; and curing said combination of components.

Yet another embodiment of the present invention is a cast article preparable by: combining components comprising a resin blend comprising a major amount of at least one rigid unsaturated polyester resin, a minor amount of at least one flexible unsaturated polyester resin, a minor amount of at least one vinyl ester resin, and a minor amount of at least one thermoplastic resin (preferably, at least one polyester-polyurethane resin); at least about 10 weight percent, based on the total weight of the composition, of filler material having an average particle size of less than about 500 microns; at least about 20 weight percent, based on the total weight of the composition, of filler material having an average particle size of about 500–1000 microns; and at least about 20 weight percent based on the total weight of the composition of filler material having an average particle size of greater than about 1000 microns; placing said combination of components in a mold; and curing said combination of components. Preferably, the cast article is a monolithic cast structure, such as a wastewater structure (e.g., interceptor, pipe, sump, etc.).

A further embodiment of the invention is a method of making a polymer concrete composite, the method comprising: preparing a resin blend comprising a major amount of at least one rigid unsaturated polyester resin, a minor amount of at least one flexible unsaturated polyester resin, a minor amount of at least one vinyl ester resin, and a minor amount of at least one thermoplastic resin (preferably, at least one polyester-polyurethane resin); adding to the resin blend at least about 10 weight percent, based on the total weight of the composition, of filler material having an average particle size of less than about 500 microns, and at least about 20 weight percent, based on the total weight of the composition, of filler material having an average particle size of about 500–1000 microns; adding a catalyst to the mixture of filler materials and resin blend; adding to the mixture of filler materials, resin blend, and catalyst, at least about 15 weight percent, based on the total weight of the composition, of filler having an average particle size of greater than about 1000 microns; and adding fibrous reinforcement material to the mixture of filler materials and resin blend.

DETAILED DESCRIPTION

This invention relates to polymer concrete compositions for use in making corrosion resistant structures and other structural composite elements, as well as methods of making same. The polymer concrete compositions of the present invention are particularly suitable for use in making articles such as pipes, pipe liners, interceptor structures, tunnel support linings, bridge deckings, building panels, armor plating, dam and spillway overflows, tank liners, electrolytic containers, cells, tanks, trenches, sumps, and other monolithic cast structures (i.e., articles cast in one piece). The polymer concrete compositions of the present invention are uniquely, although not exclusively, useful in water and wastewater infrastructures.

The polymer concrete compositions of the present invention include a mixture of at least three themoset resins (i.e., resins that solidify irreversibly when heated) and at least one thermoplastic resin (i.e., resins that soften when heated and return to their original condition when cooled). Typically, the compositions include a mixture of filler and/or reinforcement materials to liquid materials (i.e., resins) in a weight ratio of at least about 4:1, and preferably at least about 8:1. Such compositions can be molded or cast into monolithic structures, for example.

Such compositions cure (e.g., harden) to form polymer concrete composites that are advantageous compared to conventional polymer concrete composites, particularly in water and wastewater infrastructures. For example, the compositions of the present invention are advantageous because they can be formulated and molded into products very efficiently, making polymer concrete an economically viable construction material, particularly for water and wastewater infrastructures. For example, the compositions of the present invention have generally fast gel times, good green strength, and little or no shrinkage in large castings, which results in increased production rates. They typically do not require post-curing or kiln curing, which results in reduced production costs and increased production speed. Many conventional polymer concrete compositions typically gel slowly (over several hours to prevent higher exothermic temperatures which will increase the possibility of cracking) and often require 6–8 hours of molding time.

Advantageously, the polymer concrete compositions of the present invention can be cast into a single monolithic unit. A monolithic casting is important for the manufacture of water or wastewater structures without seams and cold joints, which can reduce and/or eliminate leakage, reduce installation time, and reduce the need for extensive maintenance programs. Furthermore, a monolithic casting allows for the incorporation of the necessary hardware such as plumbing drains, plugs, inlets, outlets, and overflows, which can reduce and/or eliminate the possibility of leakage.

Furthermore, the polymer concrete compositions of the present invention provide cured (e.g., hardened) composites that can be used in water or wastewater structures without the need for a separate liner, gel coat, and/or veil/mat system to act as the primary corrosion barrier system for the structure. This reduces and/or eliminates some of the problems that such components create such as, for example, the constant problem of tearing of the corrosion barrier, which then causes the structure to erode from leakage, thereby reducing the life of the structure.

The polymer concrete composites of the present invention can be used to create water or wastewater structures, such as microtunnel pipe, interceptor structures, manholes, laydown pipe, jacking pipe, etc. Preferably, the polymer concrete composites of the present invention are at least about 6.5 times stronger than Portland cement concretes in compression, at least about 5 times stronger in tensile, at least about 54 times stronger in shear, at least about 5.5 times stronger in bonding, and at least about 6 times stronger in flexure.

For example, the polymer concrete composites of the present invention exhibit about 13,000–17,000 pounds per square inch (psi) compressive strength using ASTM C-39 or ASTM C-579 and 15,000–20,000 psi using ASTM D-695. Standard Portland cement concrete exhibits only about 3,000 psi compressive strength using ASTM C-39. The polymer concrete composites of the present invention exhibit about 1500–2000 psi tensile strength using ASTM D-638 or ASTM C-307. Standard Portland cement concrete exhibits only about 370 psi tensile strength using ASTM C-307. The polymer concrete composites of the present invention exhibit about 4000–6000 psi shear strength using ASTM D-732. Standard Portland cement concrete exhibits only about 110 psi shear strength using ASTM D-732. The polymer concrete composites of the present invention exhibit about 4000 psi flexure strength using ASTM C-947 and flexure (modulus of rupture or MOR) of 2740 psi using ASTM C-78. The bond strength is about 1200–2000 psi using ASTM C-882. Standard Portland cement concrete exhibits only about 370 psi bond strength using ASTM C-882. The cold joint bond strength of a polymer concrete composition to a polymer concrete composition of the present invention is about 9500 psi (compression load) using a ASTM C-882 and a control sample of a monolithic cast polymer concrete with a compressive strength of 10,700 psi (compression load) using ASTM C-39.

Significantly, these superior properties can be produced with reduced thickness and reduced weight when compared to standard Portland cement concrete. Also, these superior properties can be produced without internal steel reinforcement to increase the structural strength, although steel reinforcement (e.g., rebar) can be used if desired. Typically and preferably, fiberglass reinforced plastic (FRP) rebar can be used in monolithic castings using the polymer concrete compositions of the present invention.

The polymer concrete compositions include a blend of at least three thermosetting resins, and at least one thermoplastic resin. Preferably, the major component by weight of the resin blend (as opposed to the entire polymer concrete composition) is a rigid thermoset unsaturated polyester resin, whereas the minor components preferably include a flexible thermoset unsaturated polyester resin, a thermoset vinyl ester resin (preferably, a modified epoxy vinyl ester resin), and a thermoplastic resin (preferably, a thermoplastic polyester-poly irethane hybrid resin). By using a major amount of a rigid unsaturated polyester resin, as opposed to the vinyl ester resin, costs can be reduced. Also corrosion resistance is reduced, although the level of corrosion resistance is sufficient for the compositions to be used in wastewater structures. Significantly, by using a major amount of a rigid unsaturated polyester resin, as opposed to the vinyl ester resin, strength is not sacrificed.

The major component of the resin blend is an unsaturated polyester resin, which upon cure is generally rigid. Because such a resin will form a generally rigid material, it is referred to herein as a "rigid" resin. Preferably, the rigid unsaturated polyester resin is an isophthalic or orthophthalic polyester resin, which can be present in combinations. More preferably, the rigid unsaturated polyester resin is an isophthalic polyester resin. Typically, rigid isophthalic polyester resins, which are the reaction products of isophthalic acid, glycols, and maleic anhydride, produce a cured resin having a tensile elongation 5% or below at failure. Such unsaturated polyester resins are typically commercially available in compositions containing an unsaturated monomer, typically styrene, with which they react when catalyzed and cure into a generally rigid material. Such materials are commercially available from Reichhold Chemicals, Inc., Research Triangle Park, N.C., under the trade designation "POLYLITE" polyester resin (product numbers 33-433-00, 33-433-01, and 33-433-05). Typically, at least about 6 weight percent and no more than about 20 weight percent, based on the total weight of the composition, of a rigid unsaturated polyester resin (or mixture of such resins) is used in the compositions of the present invention.

Preferably, the resin blend used in the polymer concrete compositions of the present invention also includes an unsaturated polyester resin, which upon cure is generally flexible. Because such a resin will form a generally flexible material, it is referred to herein as a "flexible" resin. To obtain the desired flexibility, an isophthalic polyester resin, for example, includes an elastomeric modifier, such as adipic acid, diethylene glycol, and/or dipropylene glycol. Such modifiers produce a cured resin that has a tensile elongation of about 50% at failure. Such resins are used to reduce shrinkage and cracking of the polymer concrete compositions upon curing. Preferably, the flexible unsaturated polyester resin is an isophthalic or orthophthalic polyester resin, which can be present in combinations. More preferably, the flexible unsaturated polyester resin is an isophthalic polyester resin. Such unsaturated polyester resins are typically commercially available in compositions containing an unsaturated monomer, typically styrene, with which they react when catalyzed and cure into a generally flexible material. Such materials are commercially available from Reichhold Chemicals, Inc., Research Triangle Park, N.C., under the trade designation "POLYLITE" polyester resin (product number 31830-00). Typically, at least about 0.5 weight percent and no more than about 3 weight percent, based on the total weight of the composition, of a flexible unsaturated polyester resin (or mixture of such resins) is used in the compositions of the present invention.

Another minor component of the resin blend is a vinyl ester resin, preferably a modified epoxy vinyl ester resin. Preferably, the vinyl ester resin is selected from the group of a styrenated epoxy vinyl ester resin, a bisphenol-epoxy vinyl ester resin, and combinations thereof. Such vinyl ester resins are disclosed, for example, in U.S. Pat. No. 4,375,489 (Muszynski), and are commercially available from sources such as Reichhold Chemicals, Inc., Research Triangle Park, N.C. under the trade designation "DION VER" (product number 9102, a bisphenol-epoxy vinyl ester resin), and Ashland Chemical, Inc., Columbus, Ohio under the trade designation "HETRON" (product number 922, a styrenated vinyl ester resin). Typically, at least about 0.5 weight percent and no more than about 3 weight percent, based on the total weight of the composition, of a vinyl ester resin (or mixture of such resins) is used in the compositions of the present invention.

In addition to these thermosetting resins, the resin blend includes a minor amount of a thermoplastic resin are often referred to commercially as "low profile" additives, and resins are used to improve the flexibility, hot (green) strength, and impact properties of the polymer concrete composites. They also improve the gel times and allow for higher curing temperatures with less cracking, which reduces the molding times. Futhermore, they allow for the polymer concrete composition to have a higher resin to filler ratio than many conventional polymer concretes, which typically have about 6–10 weight percent resin. The higher resin amounts improve corrosion resistance and physical properties of the polymer concrete. The thermoplastic resin is preferably a polyester-polyurethane hybrid resin. The thermoplastic polyester-polyurethane hybrid resins can be provided in gel form, pellet form, or in solution (e.g., dissolved in styrene monomer), for example. They are soluble in unsaturated polyester resins, and are typically commercially available in compositions containing an unsaturated monomer, typically styrene. Such materials are commercially available from Ashland Chemical, Co., Columbus, Ohio under the trade designation "URALLOY" (product number LP85-05) and Union Carbide, Bound Brook, N.J. under the trade designation XLP-7020. Typically, at least about 0.5 weight percent and no more than about 5 weight percent, based on the total weight of the composition, of a thermoplastic resin (or mixture of such resins) is used in the compositions of the present invention.

Although not intending to be bound by theory, it is believed that the thermoplastic resin does not take part in the curing (i.e., polymerizing and/or crosslinking) reactions of the thermoset resins. Rather, the thermoplastic resin absorbs the excess thermal energy given off by the exothermic curing process of the thermoset resins. This causes expansion of the thermoplastic resin, which counteracts the shrinkage of the thermoset resins, thereby preventing overall shrinkage of the composition. With shrinkage reduced, there are fewer or no cracks formed in the cured product. Because the presence of the thermoplastic resin reduces the amount of shrinkage, and resultant cracks, the curing process can occur at higher temperatures (e.g., about 65° C.) than conventional polymer concrete compositions. Typically, the curing temperatures of conventional polymer concrete compositions that do not include thermoplastic resins are not allowed to exceed 50° C. to avoid shrinkage and resultant cracks. Thus, cure times of such conventional polymer concrete compositions are also longer than the cure times of the compositions of the present invention.

The resin blend can also include one or more compatible unsaturated monomers for crosslinking. Examples of such comonomers include, for example: aromatic compounds such as styrene, alpha-methyl styrene, dichlorostyrene, vinyl naphthalene, vinyl phenol, and the like; unsaturated esters such as acrylic and methacrylic esters, vinyl laurate, and the like; unsaturated acids such as acrylic and alpha-alkylacrylic acids, butenoic acids, allylbenzoic acid, vinylbenzoic acid, and the like; halides such as vinyl chloride, vinylidene chloride, and the like; nitrites such as acrylonitrile, methacrylonitrile, and the like; diolefins such as butadiene, isoprene, methylpentadiene, and the like; esters of polycarboxylic acids such as diallyl phthalate, divinyl succinate, diallyl maleate, divinyl adipate, dichloroallyl tetrahydrophthalate, and the like; and mixtures thereof. Such monomers are often present in the commercially available resins.

The polymer concrete compositions also preferably include at least one catalyst. Suitable catalysts include conventional free radical polymerization initiators, such as organic peroxides, hydroperoxides, and azo compounds. Preferably, they are organic peroxides and hydroperoxides. More preferably, suitable catalysts are selected from the group consisting of benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide, t-butyl peroctoate, and the like. Most preferably, the catalyst is methyl ethyl ketone peroxide. The catalyst should preferably be able to promote a reaction and function in a temperature range of about 0° C. to about 60° C., and preferably cause the reaction to exotherm to a temperature within a range of about 60° C. to about 115° C. A catalyst (or mixture of catalysts) are typically used in an amount of about 1 weight percent to about 2 weight percent, based on the total weight of the thermoset portion of the resin blend.

The polymer concrete compositions also preferably include at least one promoter or accelerator to modify (i.e., increase or decrease) the gel time, cure time, cure rate, and/or cure temperature. Suitable promoters include transition metal salts or complexes such as cobalt naphthanate; and organic bases such as N,N-dimethylaniline (DMA) and N,N-diethylaniline (DEA). Preferably, cobalt naphthanate and DMA are used in combination. Each is preferably used in an amount of about 0.05 weight percent to about 3 weight percent, based on the total weight of the thermoset portion of the resin blend.

The polymer concrete compositions of the present invention can also include at least one coupling agent to provide improved adhesion of the resin blend to inorganic surfaces. Typically, the coupling agent increases composite wet and dry tensile strength and modulus, flexural strength and modulus, as well as wet and dry compressive strength. It can also improve the formulation filler wet-out, dispersion, and processability of the materials. Preferably, the coupling agent is a silane coupling agent. Suitable silane coupling agents include amine-functional or epoxy-functional silanes. Examples of silane coupling agents include, but are not limited to, N-(2-aminoethyl)-3-aminopropyl treimethoxysilane, N-(2-aminoethyl)-3-aminopropyl methyldimethoxysilane, (aminoethylaminomethyl)-phenylethyl trimethoxysilane, 4-aminobutyl dimethylmethoxysilane, glycidoxypropyl trimethoxysilane, bis(3-glycidoxypropyl) tetramethyldisiloxane, 3-glycidoxypropyl dimethylethoxysilane, and 3-glycidoxypropyl methyldiethoxysilane. The coupling agent is preferably used in an amount of about 0.1 weight percent to about 1 weight percent, based on the total weight of the resin blend.

The polymer concrete compositions of the present invention preferably include a mixture of fillers and/or reinforcement materials. Examples of suitable fillers and reinforcement materials include, but are not limited to, shredded bamboo, antimony trioxide, alumina trihydrate, milled fiberglass, chopped fiberglass, silica (amorphous, fumed, or crystalline), calcium carbonate, perlite, glass microspheres, talc, zinc stearate, baryte (barium sulfate), ceramic microspheres, carbon (e.g., graphite, milled and chopped), boron carbide, silicon carbide, graphite, aluminum oxide, crystalline silica, titanium dioxide, frac, polymica, muscovite mica, mica spheres, coke flour, and kesin, to name a few dry materials. Preferably, the polymer concrete compositions of the present invention include mixtures of such materials.

Typically, the polymer concrete compositions of the present invention include at least about 10 weight percent (preferably, about 10 weight percent to about 60 weight percent), based on the total weight of the composition, of filler material having an average particle size of less than about 500 microns, at least about 20 weight percent (preferably, about 20 weight percent to about 60 weight percent), based on the total weight of the composition, of filler material having an average particle size of about 500 microns to about 1000 microns, and at least about 15 weight percent (preferably, about 15 weight percent to about 60 weight percent), based on the total weight of the composition, of filler material having an average particle size of greater than about 1000 microns. The amounts and types of these filler material can be described in further detail, as described below. Preferably, the polymer concrete compositions of the present invention also include fibrous reinforcement material.

Preferably, compositions of the present invention include at least about 5 weight percent (more preferably, at least about 10 weight percent), based on the total weight of the composition, of a filler (or mixture of fillers) having an average particle size of less than about 150 microns. As used herein, particle size refers to the average of the longest dimension (e.g., diameter) of a particle. The value of 150 microns represents the average (i.e., mean) particle size, although there may be a fraction with a particle size larger than this, e.g., as large as 200 microns, for example. Typically, no more than about 40 weight percent (preferably, no greater than about 20 weight percent, and more preferably, no greater than about 14 weight percent), based on the total weight of the composition, of such extremely fine filler (or mixture of extremely fine fillers) is used in the compositions of the present invention. Material having an average particle size of about 1 micron to about 125 microns is particularly preferred.

Such extremely fine particle size fillers include crystalline silica, amorphous silica, baryte (barium sulfate), mica, glass or ceramic microspheres. These materials are primarily used to increase filler loading and/or packing of the dry materials. They enhance the flow characteristics, reduce shrinkage and water absorption, and improve chemical resistance of the final polymer concrete. They also provide leach-free composites with pores that are not connected. Baryte is particularly preferred because the baryte does not absorb the resin and has a low oil absorption rate, so that it remains generally unreactive in the composition. Also, the baryte additionally helps to prevent contact between large filler particles and fibrous reinforcement, thereby achieving a non-connected pore structure with larger filler materials. Significantly, the baryte and ceramic microspheres increase the bond strength between previously cured polymer concrete parts and between coating or repair polymer concrete and a previously cured part.

Preferred compositions also include fine, medium, and coarse fillers. Herein, fine fillers are those having an average particle size of about 150 microns to about 400 microns (a typical particle size range is about 100 microns to about 450 microns). Herein, medium fillers are those having an average particle size of about 350 microns to about 1000 microns (a typical particle size range is about 300 microns to about 900 microns). Herein, coarse fillers are those having an average particle size of greater than about 1000 microns, and preferably, greater than about 1500 microns and up to about 1 centimeter (a typical particle size range is about 2000 microns to about 9500 microns). The terms "fine," "medium," and "coarse," are somewhat obscured by the fact that there is some overlap in both absolute particle sizes and average particle sizes. Thus, such terms are used in their relative sense. Such fine, medium, and coarse particle size fillers typically include crystalline silica. They are used for filler loading and compressive strength of the polymer concrete composites. Typically, at least about 15 weight percent (preferably, at least about 20 weight percent) and no more than about 60 weight percent (preferably, no more than about 40 weight percent, and more preferably, no more than about 30 weight percent), based on the total weight of the composition, of each size filler (or mixture of each size fillers) is used in the compositions of the present invention.

Particularly preferred compositions also include fibers or fibrous reinforcement. Fibrous reinforcement materials are typically inorganic materials such as glass or ceramic. Although fibers of a variety of lengths can be used, they are typically less than about 1.5 centimeters in length. Average fiber diameters typically range from about 10 microns to about 20 microns. Typically, at least about 0.15 weight percent and no more than about 5 weight percent, based on the total weight of the composition, of the fibrous reinforcement (or mixture of fibrous reinforcement materials) is used in the compositions of the present invention. Preferably, the fibrous reinforcement is fiberglass, chopped or milled. More preferably, the fibrous reinforcement includes a combination of chopped and milled fiberglass, each used in an amount of about 0.2 weight percent to about 2 weight percent, and most preferably, in an amount of about 0.2 weight percent to about 1 weight percent. Milled fiberglass typically has a particle size of about 12 microns to about 16 microns (a typical particle size range is about 9 microns to about 23 microns). Chopped fiberglass typically has an average diameter of about 13 microns to about 18 microns (a typical diameter range is about 10 microns to about 25 microns), and an average length of about 0.3 centimeter to about 0.6 centimeter (a typical length range is about 0.3 centimeter to about 1.3 centimeters).

The polymer concrete compositions can include other additives such as, for example, flex additives, inhibitors, defoaming agents, wetting agents, pigments, dyes, mold release agents, thixotropic agents, plasticizers, stabilizers, extenders, suppressants, emission agents, penetrating agents, lock down agents, and the like. For example, in order to prevent air entrapment in the composition, a defoaming agent can be used (typically at a weight percentage of about 0.1 percent to about 0.15 percent, based on the resin blend weight).

Typically, in making polymer concrete, the liquids (i.e., resins) are blended with the dry filler materials. A sizing or binder of polyester, epoxy, or silane can be applied to some of the dry filler material surfaces prior to combining them with the liquids. More specifically, the liquids are all combined except any catalyst and then all but the coarse filler material and fibrous reinforcement are combined with these liquids. The catalyst is added next, the coarse filler material, and finally the fibrous material is added. Mixing conditions typically involve room temperature, a dry environment, and standard concrete mixing equipment. The molding time and temperatures can be adjusted to any length or temperature as needed.

The compositions of the present invention are particularly suitable for use in water and wastewater structures, such as interceptor structures, lay-down pipes, direct burial pipes, microtunnel pipes, and jackpipes. These products include base structures, transition sections, risers and are part of an assembly commonly known as "interceptor" and/or "manhole" structures. These structures are commonly positioned every 500 feet connected by sewer pipe, which typically have an inside diameter of about 18 inches to 120 inches.

Interceptor structures consist of risers, transfer sections, junction stations, base stations, and lift stations, with all types of pipe and pipe connections. Normally made out of plastic, steel, cast iron and/or concrete, sizes may range from 48 inches to 174 inches (inside diameter). These structures are connected to microtunneling pipe, slipline, and direct burial pipe. Manholes can be fabricated from polymer concrete to construct a completely corrosion resistant and leakproof sewer system.

Microtunneling pipe is specialized pipe that is suited for horizontal jacking and requires extremely high compression strength. The installation of sewers and pipelines by microtunneling as a commercial alternative to open cut construction is fast becoming an accepted form of construction. Microtunneling is a remotely controlled, laser guided, process in which personnel entry is not required. Microtunneling operations can be used to install pipelines in single pass operation to 2000 feet or greater and in diameters from 10 inches to 10 feet. Microtunneling can be used in a variety of ground conditions from soft clay to rock or boulders in ground up to 100 feet below the water table without dewatering.

Advantages of the invention are illustrated by the following examples. However, the particular materials and amounts thereof recited in these examples, as well as other conditions and details, are to be interpreted to apply broadly in the art and should not be construed to unduly limit the invention.

EXAMPLES

Exemplary Formulations

The following table lists the weight percentages, based on the total weight of the composition, of the components of typical polymer concrete compositions of the present invention:

| Component | Example 1 | Example 2 |
| --- | --- | --- |
| Reichhold "POLYLITE" 33-43305 Isophthalic Polyester Resin | 9.80% | 8.54% |
| Reichhold "DION VER" 9102 Bisphenol-Epoxy Vinyl Ester Resin | 0.96% | 0.95% |
| Reichhold "POLYLITE" 31830-00 Flexible Isophthalic Polyester Resin | 0.57% | 1.15% |
| Union Carbide XLP-7020 Thermoplastic Polyester-Polyurethane Hybrid Resin | 0.59% | 0.87% |
| N,N-Dimethylaniline* | 0.01% | 0.02% |
| 6% Cobalt Naphthenate* | 0.03% | 0.03% |
| MEKP* | 0.15% | 0.14% |
| Fine Sand | 25.86% | 25.52% |
| Medium Sand | 20.11% | 21.08% |
| Coarse Sand | 28.16% | 27.74% |
| "FILLITE" microspheres | 0.18% | 0.54% |
| Baryte (barium sulfate) | 12.93% | 12.76% |
| 0.08 cm milled fiberglass | 0.33% | 0.33% |
| 0.64 cm chopped fiberglass | 0.32% | 0.32% |

*These percentages are based on the total weight of the composition, although the amount of each of these components was determined by only the thermoset resin weight.

The following is a more detailed breakdown of each preferred component of the polymer concrete compositions listed above.

The vinyl ester resin exhibits excellent corrosion resistance to strong acids and bases, along with high impact strength, high tensile elongation, and resistance to thermal shock. The isophthalic polyester, both the flexible and rigid resins, and the polyester-polyurethane resins are used to provide toughness, tensile strength, shrinkage control, and impact strength to the polymer concrete composite. The flexible isophthalic polyester resin typically improves flexibility. The rigid isophthalic resin (i.e., the base of major component of the resin blend) exhibits high corrosion resistance and is more economical than the vinyl ester. The polyester-polyurethane hybrid resins have excellent low profile properties for both structural and zero shrink applications, are soluble in many types of unsaturated polyester resins, and provide the composite product with superior hot (green) strength and impact properties.

Suitable rigid polyester base resins are available under the trade designations "AROPOL" (7240, 7130, C708, C712, 7420, 7334, 7241, and 7242 series resins) and "HETRON" (99P series resins) from Ashland Chemical Co., Columbus, Ohio, "DION" (6334, 6631T, 6315, 31003, 32141, and 32462 series resins), "POLYLITE" (33-433-00, 33-433-01, and 33-433-05 series resins) and "ATLAC" (400 and 454 series resins) from Reichhold Chemicals, Inc., Research Triangle Park, N.C.

Suitable flexible polyester resins are available and under the trade designations "AROPOL" (7721, 7710, 7720 and 7240 series resins) from Ashland Chemical Co., Columbus, Ohio, "DERAKANE" (8084 series resins) from Dow Chemical, Midland, Mich., and "POLYLITE" (31830, 31820, and 32300 series resins) from Reichhold Chemicals, Inc., Research Triangle Park, N.C.

Suitable vinyl ester resins and are available from Dow Chemical Co., Midland, Mich., Reichhold Chemicals, Inc., Research Triangle Park, N.C., and Ashland Chemical Co., Columbus, Ohio, to name a few. Examples include styrene-modified and bisphenol epoxy-modified vinyl ester resins. Such resins are available under the trade designations "DERAKANE" (411, 440-400, 470, and 510 series resins) from Dow Chemical Co., "HETRON" (922, 992, 980, 197, and 700 series resins) from Ashland Chemical Co., and "DION" (9100, 9300, 6694, 9480 series resins) and "ATLAC" (580 series resins) from Reichhold Chemicals, Inc.

Suitable polyester-polyurethane (low profile additive) resins are available under the trade designations XLP 7020, XLP 7015, and LP40A series resins from Union Carbide, Bound Brook, N.J., 1065 shrink control resin transfer molding (RTM) series resins from Tufco, Gentry, Ak., "URAL-LOY" (LP85-05), "HETRON" (9241 and 9252-T-30), and "AROPOL" (7130 series RTM resins) from Ashland Chemical Co., "POLYLITE" (31520, 33247, 33230, 33540, 33074, 33233, and 31515 series RTM resins) from Reichhold Chemicals, Inc. Such thermoplastic-polyurethane hybrid resins are typically formulated for use in sheet molding, resin transfer molding, and bulk molding applications.

Two promoters are used in the compositions listed above—cobalt naphthenate and N,N-dimethylaniline (DMA). The cobalt naphthenate used was a 6% Cobalt Nap-All. It is available from Huls America, Summerset, N.J., and Mooney Chemical, Westlake, Ohio, for example. It is added to the composition to decrease and/or increase the time required for the composition to cure. DMA is commercially available from a variety of sources including Aldrich Chemical Co., Milwaukee, Wis. To polymerize the material to a solid thermoset structure, methyl ethyl ketone peroxide (MEKP) is used as a catalyst. MEKP is available under the trade designations "LUPERSOL DDM" from Elf Atochem, Philadelphia, Pa., "TRIGONOX" 239A from Azco, Dobstair, N.Y., "HIPOINT" from Witco Chemical Co., Marshall, Tex., "DHD" from Lucidol, New York, N.Y. Another suitable catalyst used is Cumene Hydroperoxide (CHP). This catalyst is typically blended with MEKP and is available from Witco Chemical Co., Atochem North America, and Reichhold Chemicals, Inc.

The compositions also include extremely fine fillers. These include baryte (barium sulfate), which is available from Mountain Minerals Co., Ltd., Lethbridge, Alberta, Canada. Baryte is also available under the trade designations "BARTEX" (80, 10, 65) and "OWT" from Hitox Corp., Corpus Christi, Tex., "BARA" (200 and 325 series) from Cimbar, Cartersville, Ga., and "BARITE" MP series from American Minerals, Inc., Calgary, Alberta, Canada. This material has a particle size of about 1–11 microns, depending on the grade. Another extremely fine filler is a ceramic material in the form of microspheres, which is available under the trade designation "FILLITE" (300 LF, 400 LF, and 500 LF) from Fillite (Division of Boliden Intertrade Inc.), Atlanta, Ga. This material has a particle size of about 5–300 microns.

The other filler materials included within the compositions listed above are a variety of fine, medium, and coarse silicas, silicon dioxides, and crystalline silica quartz, which are typically characterized by grades/mesh sizes. The typical physical analysis of the fine silica is as follows (percent retained/screen size): trace/#30; 30–35%/#40; 48–54%/#50; 10–14%/#70; 4–6%/#100 screen. The typical physical analysis of the medium silica is as follows (percent retained/ screen size): 1–4%/#20; 88–96%/#30; 6–10%/#40; 1–4%/ #50 screen. The typical physical analysis of the coarse silica and is as follows: (screen size/percent retained) pan/trace; #8/0.0 to 0.5%; #6/0.0 to 2.5%; #4/10% to 55%; 0.64 cm/40% to 85%; 0.96 cm/0.0 to 4%. The following is a list of a few suppliers: Demco, Inc., Des Moines, Iowa, Wedron, Wedron, Ill., Fairmount Minerals, Chardon, Ohio, Jebco, Columbus, Tex., Northern Gravel, Muscatine, Iowa, Badger Mining, Berlin, Wis., Arizona Silica, Horick, Ariz.

The fiber reinforcement is used to increase the impact strength, modulus, and overall mechanical properties of the polymer concrete composites of the present invention. The use of random reinforcement milled and chopped glass also helps the "green strength" of the cast part, so that the part may be removed from the mold before it is completely cured. Fiberglass reinforcement is available from a variety of sources including Owens-Corning Fiberglass Corp. and PPG Industries.

The resulting homogeneous compositions exhibited superior strength characteristics such as high impact resistant, high tensile-elongation, high compressive strength, high flexural strength, and high shear strength. Also, they displayed a great degree of toughness and resilience to a wide variety of aggressive corrosive environments and corrosive chemical solutions.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A castable polymer concrete composition preparable by combining components comprising:
    (a) a resin blend comprising:
        (i) a major amount of at least one rigid unsaturated polyester resin;
        (ii) a minor amount of at least one flexible unsaturated polyester resin;
        (iii) a minor amount of at least one thermosetting vinyl ester resin; and
        (iv) a minor amount of at least one thermoplastic resin;
    (b) at least about 10 weight percent, based on the total weight of the composition, of filler material having an average particle size of less than about 500 microns;
    (c) at least about 20 weight percent, based on the total weight of the composition, of filler material having an average particle size of about 500–1000 microns; and
    (d) at least about 15 weight percent, based on the total weight of the composition, of filler material having an average particle size of greater than about 1000 microns.

2. The composition of claim 1 further comprising fibrous reinforcement material.

3. The composition of claim 1 wherein the thermoplastic resin is a thermoplastic polyester-polyurethane resin.

4. The composition of claim 1 wherein the vinyl ester resin is selected from the group of a styrenated epoxy vinyl ester resin, a bisphenol-epoxy vinyl ester resin, or combinations thereof.

5. The composition of claim 1 wherein the rigid unsaturated polyester resin is an isophthalic or orthophthalic polyester resin.

6. The composition of claim 5 wherein the rigid unsaturated polyester resin is an isophthalic polyester resin.

7. The composition of claim 1 wherein the flexible unsaturated polyester resin is an isophthalic or orthophthalic polyester resin.

8. The composition of claim 1 comprising at least about 5 weight percent, based on the total weight of the composition, of filler material having an average particle size of less than about 150 microns.

9. The composition of claim 8 wherein the filler material having an average particle size of less than about 150 microns is selected from the group of silica, baryte, mica, glass microspheres, ceramic microspheres, and combinations thereof.

10. The composition of claim 9 wherein the filler material having an average particle size of less than about 150 microns comprises baryte.

11. The composition of claim 10 further comprising fibrous reinforcement material.

12. A castable polymer concrete composition preparable by combining components comprising:
    (a) a resin blend comprising:
        (i) about 6 weight percent to about 20 weight percent, based on the total weight of the composition, of at least one rigid isophthalic or orthophthalic polyester resin;
        (ii) about 0.5 weight percent to about 3 weight percent, based on the total weight of the composition, of at least one flexible isophthalic or orthophthalic polyester resin;
        (iii) about 0.5 weight percent to about 3 weight percent, based on the total weight of the composition, of at least one modified epoxy vinyl ester resin; and
        (iv) about 0.5 weight percent to about 5 weight percent, based on the total weight of the composition, of at least one thermoplastic polyester-polyurethane resin;
    (b) about 10 weight percent to about 60 weight percent, based on the total weight of the composition, of filler material having an average particle size of less than about 500 microns;
    (c) about 20 weight percent to about 60 weight percent, based on the total weight of the composition, of filler material having an average particle size of about 500 microns to about 1000 microns; and
    (d) about 15 weight percent to about 60 weight percent, based on the total weight of the composition, of filler material having an average particle size of greater than about 1000 microns; and (e) about 0.15 weight percent to about 5 weight percent, based on the total weight of the composition, of fibrous reinforcement material.

13. The composition of claim 12 wherein the filler material having an average particle size of less than about 500 microns comprises baryte.

14. The composition of claim 12 further comprising one or more unsaturated crosslinking monomers.

15. A castable polymer concrete composition preparable by combining components comprising:
(a) a resin blend comprising:
  (i) a major amount of at least one rigid unsaturated polyester resin;
  (ii) a minor amount of at least one flexible unsaturated polyester resin;
  (iii) a minor amount of at least one thermosetting vinyl ester resin;
  (iv) a minor amount of at least one thermoplastic resin; and
(b) at least about 10 weight percent, based on the total weight of the composition, of baryte.

16. A polymer concrete composite preparable by:
(a) combining components comprising:
  (i) a resin blend comprising:
    (A) a major amount of at least one rigid unsaturated polyester resin;
    (B) a minor amount of at least one flexible unsaturated polyester resin;
    (C) a minor amount of at least one thermosetting vinyl ester resin; and
    (D) a minor amount of at least one thermoplastic resin;
  (ii) at least about 10 weight percent, based on the total weight of the composition, of filler material having an average particle size of less than about 500 microns;
  (iii) at least about 20 weight percent, based on the total weight of the composition, of filler material having an average particle size of about 500 microns to about 1000 microns;
  (iv) at least about 20 weight percent, based on the total weight of the composition, of filler material having an average particle size of greater than about 1000 microns; and
(b) curing said combination of components.

17. A cast article preparable by:
(a) combining components comprising:
  (i) a resin blend comprising:
    (A) a major amount of at least one rigid unsaturated polyester resin;
    (B) a minor amount of at least one flexible unsaturated polyester resin;
    (C) a minor amount of at least one thermosetting vinyl ester resin; and
    (D) a minor amount of at least one thermoplastic resin;
  (ii) at least about 10 weight percent, based on the total weight of the composition, of filler material having an average particle size of less than about 500 microns;
  (iii) at least about 20 weight percent, based on the total weight of the composition, of filler material having an average particle size of about 500 microns to about 1000 microns;
  (iv) at least about 20 weight percent, based on the total weight of the composition, of filler material having an average particle size of greater than about 1000 microns; and
(b) placing said combination of components in a mold; and
(c) curing said combination of components.

18. The cast article of claim 17 which is a monolithic cast structure.

19. The cast article of claim 18 which is a water or wastewater structure.

20. A method of making a polymer concrete composite, the method comprising:
(a) preparing a resin blend comprising:
  (i) a major amount of at least one rigid unsaturated polyester resin;
  (ii) a minor amount of at least one flexible unsaturated polyester resin;
  (iii) a minor amount of at least one thermosetting vinyl ester resin; and
  (iv) a minor amount of at least one thermoplastic resin;
(b) adding to the resin blend at least about 10 weight percent, based on the total weight of the composition, of filler material having an average particle size of less than about 500 microns and at least about 20 weight percent, based on the total weight of the composition, of filler material having an average particle size of about 500 microns to about 1000 microns;
(c) adding a catalyst to the mixture of filler materials having an average particle size of about 1000 microns or less and resin blend;
(d) adding to the mixture of filler materials, resin blend, and catalyst, at least about 15 weight percent, based on the total weight of the composition, of filler having an average particle size of greater than about 1000 microns; and
(e) adding fibrous reinforcement material to the mixture of filler materials and resin blend.

21. The composition of claim 1 wherein the at least one thermoplastic resin is a liquid thermoplastic resin.

22. The composition of claim 12 wherein the at least one thermoplastic polyester-polyurethane resin is a liquid thermoplastic polyester-polyurethane resin.

23. The composition of claim 15 wherein the at least one thermoplastic resin is a liquid thermoplastic resin.

24. The composition of claim 16 wherein the at least one thermoplastic resin is a liquid thermoplastic resin.

25. The composition of claim 17 wherein the at least one thermoplastic resin is a liquid thermoplastic resin.

26. The composition of claim 20 wherein the at least one thermoplastic resin is a liquid thermoplastic resin.

* * * * *